July 12, 1932.   R. E. LANGILL   1,866,937
SAWMILL DOG
Filed Sept. 23, 1925   4 Sheets-Sheet 1

INVENTOR:
ROSS E. LANGILL
BY Bottum, Hudnall, Sacher and McNamara.
ATTORNEYS.

July 12, 1932.    R. E. LANGILL    1,866,937
SAWMILL DOG
Filed Sept. 23, 1925    4 Sheets-Sheet 2
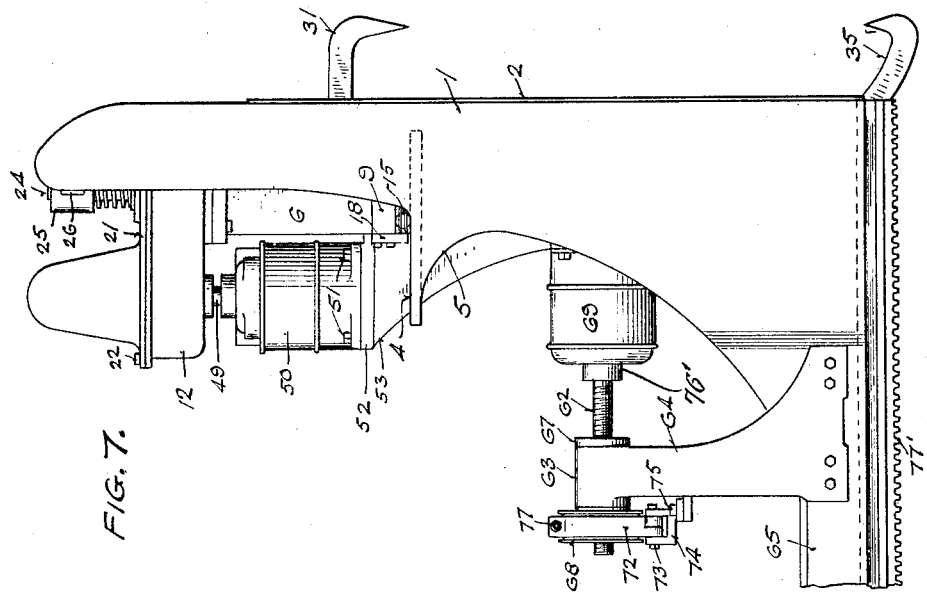
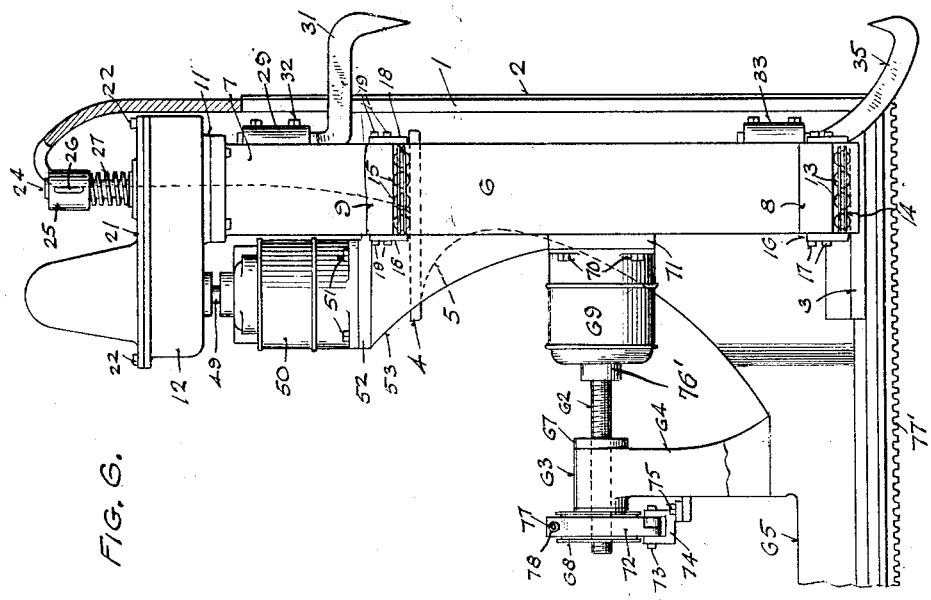
INVENTOR:
ROSS E. LANGILL
BY Bottum, Hudnall, Secher and McNamara
ATTORNEYS.

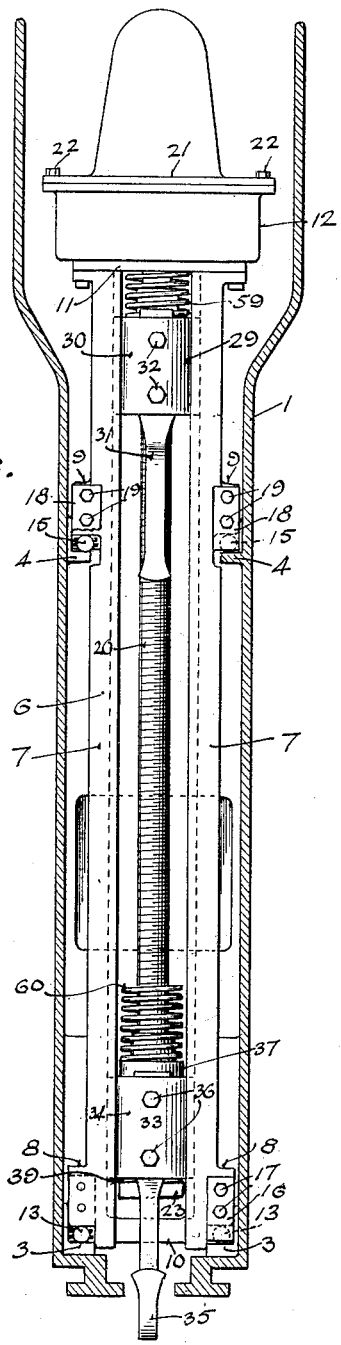
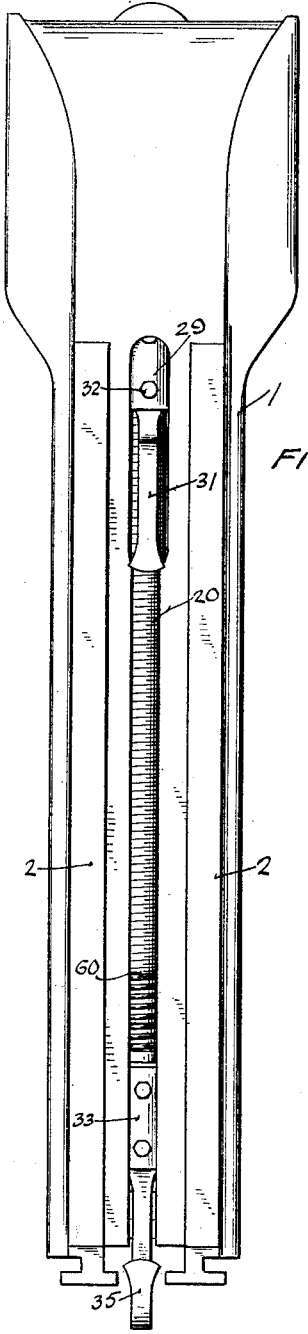

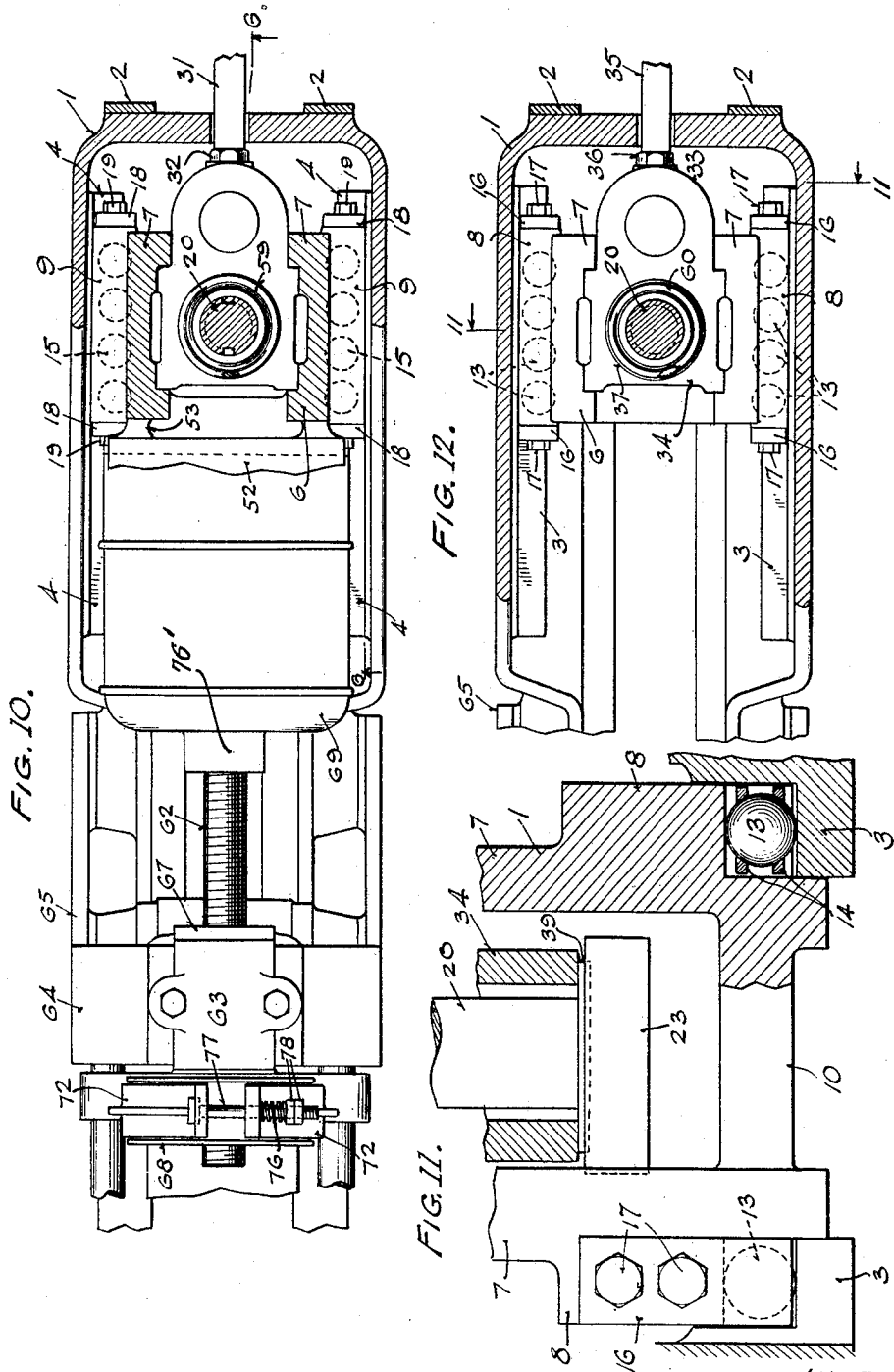

Patented July 12, 1932

1,866,937

UNITED STATES PATENT OFFICE

ROSS E. LANGILL, OF MENOMINEE, MICHIGAN, ASSIGNOR TO THE PRESCOTT COMPANY, OF MENOMINEE, MICHIGAN, A CORPORATION OF MICHIGAN

SAWMILL DOG

Application filed September 23, 1925. Serial No. 57,993.

This invention relates to improvements in sawmill dogs, and more particularly to the means for effecting movement of the log-holding elements or teeth with respect to the face of the knee.

In sawmill dogs constructed heretofore the the log-holding elements or teeth have been connected in various ways to links arranged to cause movement of the teeth toward and away from each other to hold or release a log, this link mechanism being employed instead of any other mechanism such as a screw and nut because the links may be actuated by hand to effect movement of the teeth with sufficient rapidity for the requirements of present day practice, whereas if a screw-and-nut mechanism were used it would require many turns of the screw and a comparatively greater amount of time to effect a given movement of the teeth as compared with a similar movement of the teeth actuated by the link mechanism. For this reason, therefore, the screw-and-nut mechanism has not been adopted, although such mechanism provides a very smooth action, is simple in construction and is self-locking. The log-holding elements or teeth of some types of sawmill dogs constructed heretofore, furthermore, are manually adjustable in a direction transverse to the face of the knee so that the teeth may be extended outwardly beyond the face of the knee only a short distance for sawing a thin board, or extended outwardly a much greater distance beyond the face of the knee for holding a log or irregular piece. This manual adjustment for extending the teeth varying distances beyond the face of the knee also requires considerable time and is too slow for present day sawmill practice.

One of the objects of the present invention, therefore, is to provide an improved sawmill dog having a screw-and-nut mechanism for effecting movement of the log-holding elements or teeth with respect to the face of the knee and a motor for operating such mechanism whereby the teeth may be moved with sufficient rapidity to satisfy the requirements of present day sawmill practice, and to provide means adapted to permit continued operation of the motor upon engagement of the teeth with a log.

Another object is to provide an improved sawmill dog having log-holding elements or teeth supported for movement in a vertical plane and for movement in a horizontal plane with respect to the face of the knee whereby the teeth may be extended varying distances beyond the latter.

Another object is to provide an improved sawmill dog having log-holding elements or teeth supported for movement in a direction transverse to the face of the knee, with a screw-and-nut mechanism for effecting this movement of the teeth and a motor for operating such mechanism.

Another object of the invention is to provide an improved sawmill dog having advantages over those constructed heretofore as regards smoothness of operation, simplicity of construction, and adjustment of the log-holding elements or teeth with respect to the face of the knee.

Other objects and advantages will hereinafter appear.

For the purpose of illustrating the invention an embodiment thereof is shown in the drawings, in which Figure 1 is a side elevation, partly in section;

Fig. 6 is a side elevation, partly in section, the section being taken on line 6—6 of Fig. 10;

Fig. 7 is a side elevation;

Fig. 8 is a front elevation, partly in section, looking toward the left in Fig. 1, some of the parts being removed;

Fig. 9 is a front elevation, looking toward the left in Fig. 1;

Fig. 10 is a section on line 10—10 of Fig. 1;

Fig. 11 is an enlarged section on line 11—11 of Fig. 12; and

Fig. 12 is an enlarged section on line 12—12 of Fig. 1.

Figure 1:
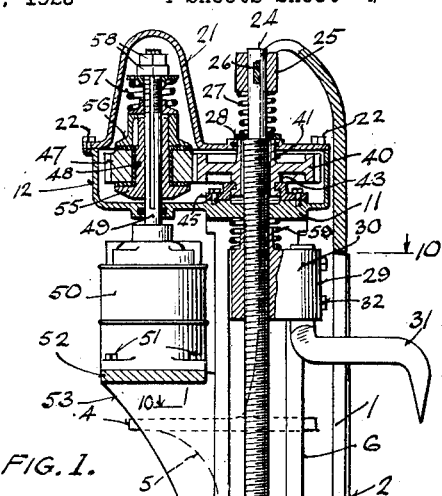
Figure 1:
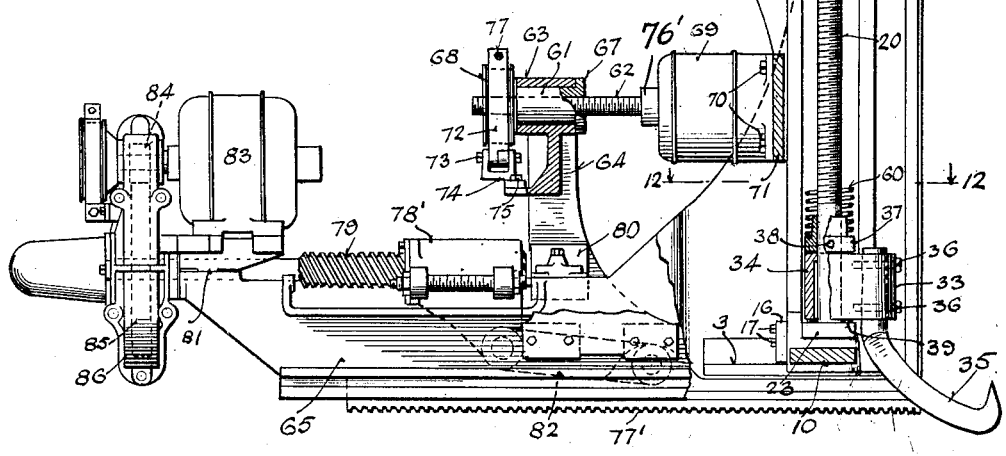

The knee 1 is provided with a face 2 and lower horizontal tracks 3 and upper horizontal tracks 4 extending inwardly from opposite sides of the knee for the purpose hereinafter explained, the rear portions of tracks 4 being supported by reinforcing flanges 5, as shown in Figs. 1 and 7. A member 6 comprises vertical side channel members 7 provided with lower horizontal portions 8 extending outwardly therefrom and with similar upper horizontal portions 9, lower and upper cross members 10 and 11 connecting the ends of members 7 and holding the latter rigidly in parallel spaced relation, and a gear housing 12 which may be cast integrally with cross member 11, as shown. Ball bearings 13 held in position by suitable frames or races 14 are placed between the lower tracks 3 of knee 1 and the lower outwardly extending portions 8 of member 6, while similar ball bearings 15 are placed between the upper tracks 4 of knee 1 and the upper outwardly extending portions 9 of member 6, plates 16 being secured by means of bolts 17 to portions 8 and arranged to extend over opposite ends of the ball bearing units to hold the latter in position, similar plates 18 being secured by means of bolts 19 to the upper portions 9 of member 6 to hold ball bearings 15 in position. From the foregoing it will be seen that member 6 is supported upon the anti-friction means or ball bearings 13 and 15 for movement in a direction transverse to face 2 of knee 1.

Figure 2:
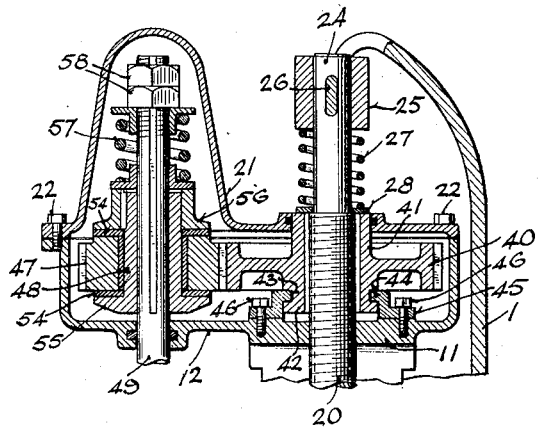
Fig. 2 is an enlarged, sectional view, taken from Fig. 1.

Referring more particularly to Figs. 1 and 2, a vertical screw 20 extends loosely through upper cross member 11 of member 6 and a cap or cover plate 21 secured to housing 12 by means of bolts 22, the lower end of screw 20 being unthreaded and provided with a head 23, the upper end 24 of the screw being reduced and provided with a collar 25 fixed thereto by means of a pin 26, a spring 27 and a washer 28 being arranged upon the reduced end 24 between collar 25 and cover plate 21 to prevent screw 20 from dropping through housing 12. An upper log-holding element 29 comprises a block 30 arranged upon screw 20 and fitting loosely into vertical channel members 7, as more clearly shown in Fig. 10, and a log-engaging portion or tooth 31 secured to block 30 by means of bolts 32 and arranged to extend outwardly beyond the face of knee 1. A similar lower log-holding element 33 comprises a block 34 loosely fitted upon the lower unthreaded end of screw 20 and fitting loosely into channel members 7, and a log-engaging portion or tooth 35 secured to block 34 by means of bolts 36, a collar 37 being arranged upon screw 20 a slight distance above block 34 and being fixed against axial movement along the screw by means of a pin 38. A suitable thrust bearing 39 may be arranged upon screw 20 between head 23 thereof and block 34. From the foregoing it will be seen that screw 20 and the log-holding elements 29 and 33 arranged thereon are supported by spring 27 which is compressed between collar 25 and washer 28, and that screw 20 is held in a vertical position by the coaction or engagement of blocks 30 and 34 with vertical channel members 7. A gear or driving member 40 is splined on the upper end of screw 20 and is provided with a hub 41 journaled in cover plate 21 and a hub 42 provided with an annular groove 43 which receives an annular flange 44 of a bearing member 45 secured by means of bolts 46 to cross member 11, bearing member 45 being made in two or more parts to permit assembly thereof upon hub 42 of gear 40. It will thus be seen that cover plate 21 and member 45 provide upper and lower bearings, respectively, for gear 40 and that the interfitting relation between member 45 and hub 42 of gear 40 holds the latter against vertical movement while permitting rotary movement thereof to rotate screw 20. A gear 47 is arranged in mesh with gear 40 and is loosely mounted on a member 48 splined to the armature shaft 49 of a reversible electric motor 50 secured by means of bolts 51 to a shelf 52 supported by flanges or webs 53 which may be cast integrally with vertical channel members 7. Friction discs 54 are arranged between gear 47 and the head 55 of member 48 and a member 56 splined to member 48, a spring 57 being arranged upon the upper end of armature shaft 49 and held compressed between member 56 and adjustable nuts 58 whereby frictional engagement is maintained between friction discs 54, members 48 and 56, and gear 47 to cause the latter to rotate with armature shaft 49. A spring 59 is arranged on screw 20 between block 30 and cross member 11 for the purpose hereinafter explained. From the foregoing it will be seen that upon operation of motor 50 in a given direction screw 20 will be rotated to cause the upper log-holding element 29 to travel downwardly along the screw. Upon engagement of the log-engaging portion or tooth 31 with a log, block 30 will be held against further downward movement so that upon continued rotation of screw 20 by motor 50 the screw will be caused to move upwardly through block 30 and gear 40, member 45 acting at this time to hold gear 40 against upward vertical movement with screw 20. Upon this upward vertical movement of screw 20, the log-holding element 33 will be carried upward therewith until tooth 35 engages and is embedded into the underside of the log with the same force that tooth 31 is forced into the upper side of the log, at which time friction discs 54 will permit gear 47 to slip completely with respect to shaft 49 to permit continued operation of motor 50. When teeth 31 and 35 have thus been embedded in the log to hold the same securely against the face of knee 1, motor 50 may be shut down, teeth 31 and 35 being held securely in engagement with the log and against movement away from each other by the self-locking action between block 30 and screw 20. When the log is to be released, motor 50 is reversed to cause downward movement of screw 20 through block 30 and gear 40, collar 37 then acting upon the upper side of block 34 to cause downward movement thereof with screw 20 whereby tooth 35 is disengaged from the log. Screw 20 will continue to move downwardly through gear 40 and block 30 until spring 27 is compressed a sufficient amount to prevent further downward movement of the screw, at which time block 30 will be caused to move upwardly along the screw to disengage tooth 31 from the upper side of the log. Block 30 will continue to move upwardly until spring 59 is compressed a sufficient amount between block 30 and cross member 11 to cause slight downward movement of screw 20 through gear 40 and consequent further compression of spring 27, at which time partial slippage of gear 47 will occur. When block 30 engages cross member 11 further compression of spring 27 will occur until gear 47 slips completely with respect to armature shaft 49. It will thus be seen that springs 27 and 59 provide a cushion and act to start slippage of gear 47 before block 30 engages cross member 11 to positively lock screw 20 against rotation and to thereby cause complete slippage of gear 47, this action of these springs thereby acting to prevent strain upon the various parts which would otherwise occur if the springs were not present and block 30 permitted to engage cross member 11 to positively lock gear 47 against rotation before any slippage of gear 47 has occurred and to thus place a sudden load upon motor 50.

A spring 60 may be arranged on screw 20 between blocks 30 and 34 to act in the same manner as springs 27 and 59 when motor 50 is operated in a direction to cause movement of blocks 30 and 34 toward each other. When spring 60 is compressed a certain amount between blocks 30 and collar 37 partial slippage of gear 47 will occur before complete slippage thereof is caused by positive engagement of collar 37 and block 30, spring 60 thereby acting in the same manner as springs 37 and 59 to prevent unnecessary strain upon the various parts.

The means for effecting movement of member 6 upon the anti-friction means or ball bearings 13 and 15 in a direction transverse to the face 2 of knee 1 will now be described. A nut 61 is arranged on a screw 62 and journaled loosely in a bearing 63 at the top of an inverted U-shaped bracket 64 fitted over the base 65 of knee 1 and secured thereto by means of bolts 66. Nut 61 is provided with a head 67 at one end thereof acting against one end of bearing 63 and with a drum 68 at the other end thereof acting against the other end of bearing 63, head 67 and drum 68 thereby holding nut 61 against movement in a direction transverse to the face of knee 1 while permitting free rotary movement of the nut in bearing 63 for the purpose hereinafter explained. Screw 62, as indicated in the drawings, may be a continuation of the armature shaft of a reversible electric motor 69 secured by means of bolts 70 to a cross piece 71 extending across vertical channel members 7 and which may be cast integrally therewith. Friction brake members 72 are pivotally connected by means of a bolt 73 to a suitable bracket 74 secured to bracket 64 by means of bolts 75, as shown in Fig. 1, the brake members 72 fitting about drum 68 and being held in frictional engagement therewith by means of the spring 76 arranged upon the bolt 77 extending loosely through the upper ends of members 72. Nuts 78 are adjusted on bolt 77 to compress spring 76 so that brake members 72 grip drum 68 and hold nut 61 against rotary movement with screw 62. From the foregoing it will be seen that upon operation of motor 69 in a given direction screw 62 will move through nut 61 to the left, as viewed in Fig. 1, whereby member 6 will be caused to slide rearwardly upon the anti-friction means or ball bearings 13 and 15 to recede teeth 31 and 35, and that upon reverse operation of motor 69 screw 62 will move through nut 61 to the right to cause forward movement of member 6 and teeth 31 and 35 carried thereby. It will further be seen that the screw-and-nut mechanism just described permits of fine adjustment of member 6 in a direction transverse to face 2 of knee 1 whereby teeth 31 and 35 may be adjusted to extend only a slight distance beyond the face of knee 1 for sawing a thin board or may be extended outwardly any desired distance beyond the face of the knee for sawing logs of various sizes and irregular pieces. When motor 69 is permitted to operate to cause forward movement of member 6 until blocks 30 and 34 engage the inner side of face 2 of the knee, screw 61 will then be held against axial movement through nut 61, at which time brake members 72 will slip completely with respect to drum 68 to permit rotation of nut 61 with screw 62. In like manner, when motor 69 is operated to cause rearward movement of member 6 until bearing 76 of the motor engages head 67 of nut 61, brake members 72 will again slip completely with respect to drum 68 to permit rotation of nut 61 with screw 62 upon continued operation of motor 69. The parts may be so arranged that teeth 31 and 35 are completely receded within knee 1 when bearing 76 of motor 69 engages the head 67 of nut 61.

Figure 3:
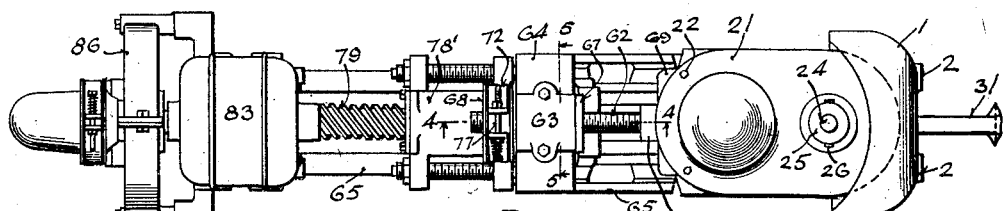
Fig. 3 is a plan view.
Figure 4:
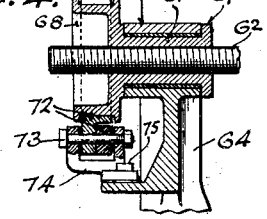
Fig. 4 is an enlarged section on line 4—4 of Fig. 3.
Figure 5:
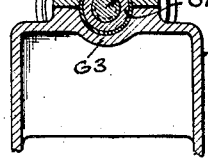
Fig. 5 is an enlarged section on line 5—5 of Fig. 3.

For the purpose of effecting a tapering movement of knee 1 with respect to the usual setting rack 77' a nut 78' may be arranged upon a screw 79 journaled in suitable bearings 80 and 81 on the base 65 of knee 1 and connected by means of a link 82 to rack 77'. A reversible motor 83 may be secured to the base of knee 1, as shown in Figs. 1 and 3, and connected by means of suitable gears 84 and 85 to screw 79, the gears being enclosed within a housing 86. The construction and manner of operation of the tapering mechanism just described is substantially identical to that shown and described in copending application Serial Number 56,590, filed Sept. 16, 1925, and as it forms no part of the present invention has only been shown and described with sufficient clearness to enable those skilled in the art to understand the manner in which tapering mechanism of the type shown and described in the above copending application may be applied to a sawmill dog constructed in accordance with the present invention. Any other type of tapering mechanism, of course, may be used.

From the foregoing it will be seen that an improved sawmill dog has been provided in which movement of the log-holding elements or teeth 31 and 35 with respect to the face 2 of the knee is effected by means of a screw-and-nut mechanism and a motor for operating such mechanism, and that an improved sawmill dog has been provided in which the teeth 31 and 35 may be moved with respect to the face 2 of the knee in vertical and horizontal planes. It will further be seen that an improved sawmill dog has been provided having a screw-and-nut mechanism for effecting movement of the teeth with respect to the face of the knee, a motor for operating such mechanism, and means adapted to slip to permit continued operation of the motor when the teeth are held against movement due to engagement thereof with a log or for other reasons whereby stalling of the motor and consequent damage thereto is prevented.

One embodiment of the invention has been shown and described, but of course various changes in the size, shape and arrangement of the parts may be adopted without departing from the spirit of the invention or the scope of the claims.

The invention claimed is:

1. A sawmill dog comprising a knee having a face, a member slidably mounted on said knee for movement with respect thereto transverse to said face of the same, a rotatable screw carried by said member, log-holding elements arranged upon said screw and provided with log-engaging portions transverse to the face of said knee, means for rotating said screw in either direction to cause movement of said log-holding elements toward and away from each other, and means for effecting said movement of said first-mentioned member and holding the same in adjusted position whereby said portions of said log-holding elements may be operatively positioned and maintained varying distances beyond the face of said knee.

2. A sawmill dog comprising a knee having a face, a rotatable screw, log-holding elements arranged upon said screw, means for rotating said screw in either direction to cause movement of said elements toward and away from each other, and means for supporting said screw for translatory movement in a direction transverse to the face of said knee whereby said elements may be operatively positioned varying distances beyond said face.

3. A sawmill dog comprising a knee having a face, a rotatable screw, log-holding elements arranged upon said screw and provided with log-engaging portions extending beyond the face of said knee, power means for rotating said screw in either direction to cause movement of said elements toward and away from each other, a gear splined on said screw and supported against movement in a direction axially thereof, and means providing a driving connection between said gear and said power means and being operable to permit continued operation of the latter upon engagement of said log-engaging portions with a log.

4. A sawmill dog comprising a knee having a face, a carrier member mounted on said knee and constrained to free sliding movement back and forth with respect to the knee face, a rotatable screw mounted on said carrier member, a log-holding member operatively engaged with said screw and having a log engaging portion extending beyond the face of the said knee, and a motor fixedly and directly mounted on said carrier member and having a driving connection with said screw for effecting rotation thereof to cause movement of said log-holding member along the same.

5. A sawmill dog comprising a knee having a face, a log-holding element associated with said knee and supported for free translatory movement transverse to the face thereof to position said element varying distances beyond said face, and means for effecting said movement of said element and controlling the position thereof, said means including a screw-and-nut mechanism and a reversible motor for operating the latter.

6. A sawmill dog comprising a knee having a face, a member associated with said knee and freely supported for movement back and forth in a direction transverse to the face thereof, a log-holding element carried by said member and having a log-engaging portion arranged to extend beyond the face of said knee, a reversible motor secured to said member, a screw operated by said motor, a nut fixed against movement in said direction, and means opposing rotation of said nut, said nut cooperating with said screw to cause said movement of said member upon operation of said motor whereby said log-engaging portion of said element may be extended varying distances beyond the face of said knee and in such manner as to operatively engage the log in any adjustment.

7. A sawmill dog comprising a knee having a face, a log-holding element associated with said knee and supported thereby for movement in a vertical plane and for movement in a horizontal plane with respect to the face of said knee, and screw means for effecting said movements of said element selectively.

8. A sawmill dog comprising a knee having a face, a screw associated with said knee and supported thereby for rotary movement about its own longitudinal axis and for bodily movement in a direction transverse to the face of said knee, a log-holding element threaded on said screw and provided with a log-engaging portion arranged to extend outwardly beyond the knee face, a reversible motor for effecting rotary movement of said screw, and a second reversible motor for effecting said bodily movement of said screw.

9. A sawmill dog comprising a knee, a member associated with said knee for movement with respect thereto in a direction transverse to the knee face, a vertical screw supported by said member for rotation, means for rotating said screw, a log-holding element arranged upon the latter for actuation thereby, said element coacting with said member to hold said screw in vertical position and means for imparting said transverse movement to said member.

10. A sawmill dog comprising a knee having a face, a vertical screw supported for rotary movement, the lower end of said screw being unthreaded, an upper log-holding element arranged on said screw, a lower log-holding element loosely arranged on the lower unthreaded end of said screw, said elements having log-engaging portions extending outwardly beyond the face of said knee, means holding said lower element against axial movement with respect to said screw, a rotary driving member splined on said screw to cause rotation of the latter and to permit upward axial movement of the same with respect to said driving member upon engagement of said upper log-holding element with the upper side of a log whereby said lower log-holding element is moved upwardly with said screw into engagement with the underside of said log, and means for rotating said driving member.

11. A sawmill dog comprising a knee having a face, a member associated with said knee, log-holding means carried by said member and adapted for movement with respect thereto, actuating means for said log-holding means, anti-friction means supporting said member for free movement back and forth and transverse to the face of said knee, a screw-and-nut mechanism for effecting said movement of said member and controlling the position thereof, and a reversible motor for operating said mechanism.

12. In a sawmill dog, the combination with a knee having a face, a member supported by said knee for free movement transverse to the face thereof, log-holding means carried by said member and arranged to extend beyond the face of said knee, actuating means for said log-holding means, a motor carried by said member for operating said actuating means, means for effecting said movement of said member, and controlling the position thereof, and a second motor carried by said member and associated with said last-mentioned means for operating the same.

13. In a sawmill dog, a knee having a face, a vertical screw, means associated with said knee and supporting said screw for rotary and vertical movements with respect to said knee, upper and lower log-holding elements arranged on said screw and having log-engaging portions extending beyond the face of said knee, and means for rotating said screw whereby said upper log-holding element may be caused to move downwardly into engaging relation with the upper side of a log and said screw then caused to move upwardly to effect movement of said lower log-holding element into engaging relation with the underside of the log.

14. In a sawmill dog, a knee having a face, a member associated with said knee for limited movement with respect thereto in a direction transverse to the face thereof, log-holding means carried by said member and arranged to extend beyond the face of said knee, screw-and-nut mechanism for effecting said movement of said member whereby said log-holding means may be caused to extend varying distances beyond the face of said knee, operating means for said mechanism, and friction means associated with said mechanism and adapted and arranged to permit continued operation thereof by said operating means when said member is held against movement in said direction.

15. In a sawmill dog, a knee having a face, a member associated with said knee for limited movement in a direction transverse to the face thereof, log-holding means carried by said member and arranged to extend beyond the face of said knee, a rotatable nut fixed against movement in said direction, a screw arranged for coaction with said nut and said member whereby said movement of the latter is effected upon rotation of said screw to cause said log-holding means to extend varying distances beyond the face of said knee, means for rotating said screw, and friction brake members adapted and arranged to hold said nut against rotation with said screw when said member is intermediate its extreme positions with respect to said knee but to permit rotation of said nut with said screw when said member reaches either of its extreme positions with respect to said knee.

16. In a sawmill dog, a knee, a vertical screw, means supporting said screw for rotary and axial movement with respect to said knee, log-holding means arranged on said screw for actuation thereby, operating means for said screw, and a spring adapted and arranged to oppose said axial movement of said screw in one direction while permitting said rotary movement of the latter.

17. In a sawmill dog, a knee having a face, a rotatable screw associated with said knee, log-holding means arranged on said screw for coaction therewith whereby said means may be caused to move with respect to the face of said knee upon rotation of said screw in either direction, a reversible motor carried by said knee, and a pair of gears providing a driving connection between said screw and said motor, one of said gears being splined on said screw and supported against movement in a direction axially thereof.

18. A sawmill dog comprising a knee, a carrier member mounted thereon, a screw, means on said carrier member for supporting the screw for rotation and for axial movement in one direction, a log engaging member threadedly mounted on the screw, a log engaging member swiveled on the screw, means for constraining the log engaging members to rectilinear movement toward and away from each other and means for rotating the screw in such manner as to first cause the log engaging member threaded on the screw to engage the log and to next cause the log engaging member swiveled on the screw to engage the log.

19. In a sawmill dog, a knee, a carrier member mounted on the knee, a screw, means on the carrier member for supporting the screw for free rotary movement and for axial movement in one direction, a log engaging member threaded on the screw, a log engaging member swiveled on the screw, means for constraining the log engaging members to rectilinear movement, a motor mounted on the carrier member and motion transmission means between the motor and the screw and including a gear element splined on the screw.

20. In a sawmill dog, a knee, a carrier member mounted on the knee, a screw, means on the carrier member for supporting the screw for rotary movement and for axial movement in one direction, a log engaging member threaded on the screw, a log engaging member swiveled on the screw, means for constraining the log engaging member to rectilinear movement, a motor fixed to the carrier member, a gear element connected to the screw to impart movement thereto in any adjustment thereof, a coacting gear element, and means providing a driving connection between the last mentioned gear element and the motor whereby said last mentioned gear element is normally driven from the motor but may slip relative thereto when encountering a predetermined resistance.

21. A sawmill dog comprising a knee, a carrier member mounted thereon, a screw, means on said carrier member for supporting the screw for rotation and for axial movement in one direction, a log engaging member threadedly mounted on the screw, a a log engaging member swiveled on the screw, means for constraining the log engaging members to rectilinear movement, a motor fixed to the carrier member, motion transmission means between the motor and the screw including a gear element splined to the screw and a coacting gear element, a motor having a driving connection with the coacting gear element designed to slip under a predetermined load and spring means interposed between log engaging members and cooperable therewith to insure gradual increase of the load when said log engaging members are drawn together.

22. A sawmill dog comprising a knee, a carrier member mounted thereon, a screw, means on said carrier member for supporting the screw for rotation and for axial movement in one direction, a log engaging member threadedly mounted on the screw, a log engaging member swiveled on the screw, means for constraining the log engaging members to rectilinear movement, a motor fixed to the carrier member, motion transmission means between the motor and the screw including a gear element splined to the screw and a coacting gear element, a motor having a driving connection with the coacting gear element designed to slip under a predetermined load and spring means interposed between one of the log engaging members and the carrier member and cooperate therewith to insure gradual increase of the load when such log engaging member is drawn into engagement with the portion of the carrier member with which such spring coacts.

23. A sawmill dog comprising a knee, a carrier member mounted thereon, a screw, means on said carrier member for supporting the screw for rotation and for axial movement in one direction, a log engaging member threadedly mounted on the screw, a log engaging member swiveled on the screw, means for constraining the log engaging members to rectilinear movement, a motor fixed to the carrier member, motion transmission means between the motor and the screw including a gear element splined to the screw and a coacting gear element, a motor having a driving connection with the coacting gear element designed to slip under a predetermined load, said means on said carrier member for supporting the screw for rotary movement and for axial movement in one direction embodying a spring to permit the screw to yield to a limited extent in the direction in which it is substantially held against movement.

In witness whereof I hereto affix my signature.

ROSS E. LANGILL.